(12) United States Patent
Zone et al.

(10) Patent No.: US 7,357,378 B2
(45) Date of Patent: Apr. 15, 2008

(54) DIVIDED WALL EXCHANGE COLUMN

(75) Inventors: Ian Robert Zone, Woking (GB); Clive Chalk, Oswestry (GB); Kenneth William Kovak, Macungie, PA (US); Swaminathan Sunder, Allentown, PA (US)

(73) Assignee: Air Prodcuts and Chemicals, Inc., Allentown, PA (US)

( * ) Notice: Subject to any disclaimer, the term of this patent is extended or adjusted under 35 U.S.C. 154(b) by 396 days.

(21) Appl. No.: 10/967,590

(22) Filed: Oct. 18, 2004

(65) Prior Publication Data

US 2006/0082006 A1    Apr. 20, 2006

(51) Int. Cl.
*B01F 3/04* (2006.01)

(52) U.S. Cl. .......................... 261/94; 261/95
(58) Field of Classification Search ................ 261/94, 261/95, 96, 97
See application file for complete search history.

(56) References Cited

U.S. PATENT DOCUMENTS

| | | | | |
|---|---|---|---|---|
| 251,329 | A * | 12/1881 | Winn | 261/94 |
| 900,827 | A | 10/1908 | Brown | |
| 4,230,533 | A * | 10/1980 | Giroux | 203/1 |
| 4,234,391 | A * | 11/1980 | Seader | 203/26 |
| 4,361,469 | A * | 11/1982 | Trutna | 203/99 |
| 4,615,770 | A | 10/1986 | Govind | |
| 4,681,661 | A | 7/1987 | Govind | |
| 5,339,648 | A | 8/1994 | Lockett et al. | |
| 5,585,046 | A * | 12/1996 | Jansen et al. | 261/97 |
| 5,709,780 | A | 1/1998 | Ognisty et al. | |
| 5,785,819 | A | 7/1998 | Kaibel et al. | |
| 5,914,012 | A * | 6/1999 | Kaibel et al. | 202/158 |
| 6,089,549 | A * | 7/2000 | Ingram et al. | 261/94 |
| 6,419,892 | B1 | 7/2002 | Schutte | |
| 6,551,465 | B1 * | 4/2003 | Van Zile et al. | 202/158 |
| 6,645,350 | B1 * | 11/2003 | Steacy | 202/158 |
| 6,930,206 | B1 * | 8/2005 | Groten et al. | 568/38 |
| 7,090,748 | B2 * | 8/2006 | Kaibel et al. | 202/158 |
| 7,128,837 | B2 * | 10/2006 | Behrendt et al. | 210/321.8 |
| 2001/0052453 | A1 | 12/2001 | Rust et al. | |
| 2002/0157537 | A1 | 10/2002 | Hayashida et al. | |
| 2002/0195727 | A1 | 12/2002 | Sunder | |
| 2004/0020238 | A1 | 2/2004 | Kalbassi et al. | |

FOREIGN PATENT DOCUMENTS

| | | |
|---|---|---|
| EP | 0 192 539 A1 | 8/1986 |
| EP | 0192539 A1 | 8/1986 |

(Continued)

*Primary Examiner*—Scott Bushey
(74) *Attorney, Agent, or Firm*—Willard Jones, II

(57) ABSTRACT

A divided wall exchange column includes a dividing wall strengthened by stiffening members and/or a double wall design to better withstand pressure differentials and minimize temperature differentials. When a double wall is used, cost of manufacture and installation is minimized by reducing the manufacturing tolerances required while providing a design robust in construction, installation, and operation. When structured packing is used, the stiffening members, combined with positioning the layers of packing at preferred angles relative to the dividing wall, result in minimal interference with the heat and/or mass transfer process while minimizing the complexity of manufacture and construction of the packing. Further, by positioning the top layer of structured packing at other preferred angles relative to the dividing wall, a simplified liquid distributor design may be used in the divided wall exchange column while the layers below may still be orientated as described above with all the associated benefits.

5 Claims, 5 Drawing Sheets

FOREIGN PATENT DOCUMENTS

| | | |
|---|---|---|
| EP | 0 700 716 A1 | 3/1996 |
| EP | 0700716 A1 | 3/1996 |
| EP | 1 084 741 A1 | 3/2001 |
| FR | 2 776 206 | 9/1999 |
| GB | 549 068 | 11/1942 |
| GB | 549068 A | 11/1942 |

* cited by examiner

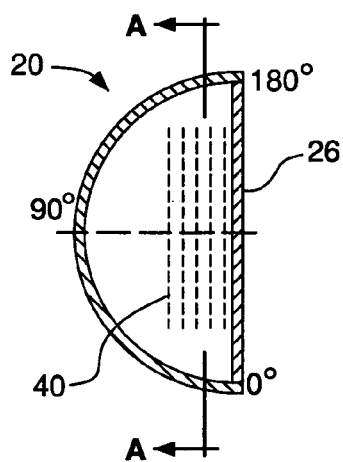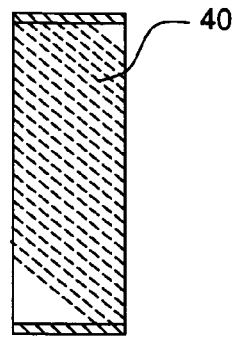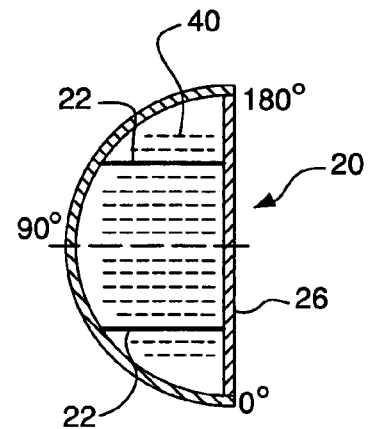
FIG. 7  FIG. 7A  FIG. 8
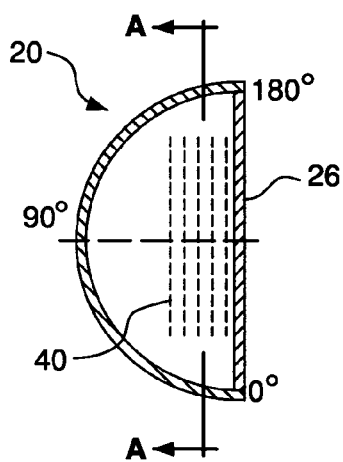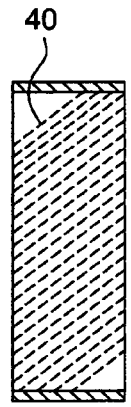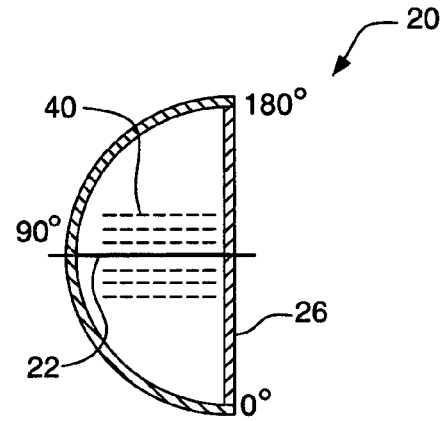
FIG. 9  FIG. 9A  FIG. 10

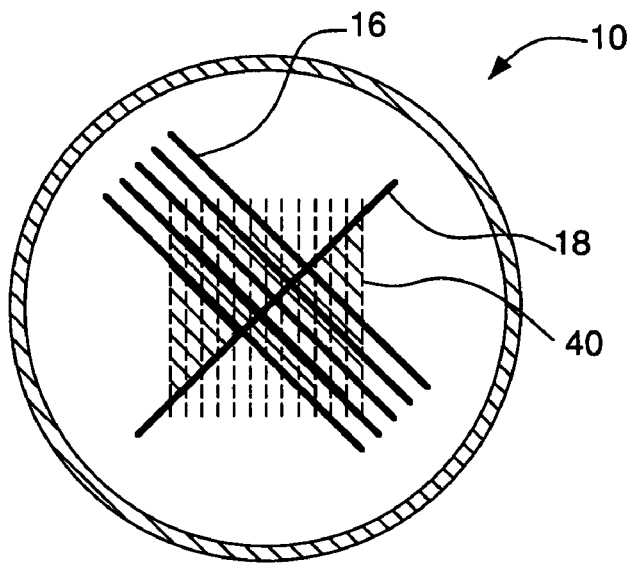
FIG. 15
(Prior Art)
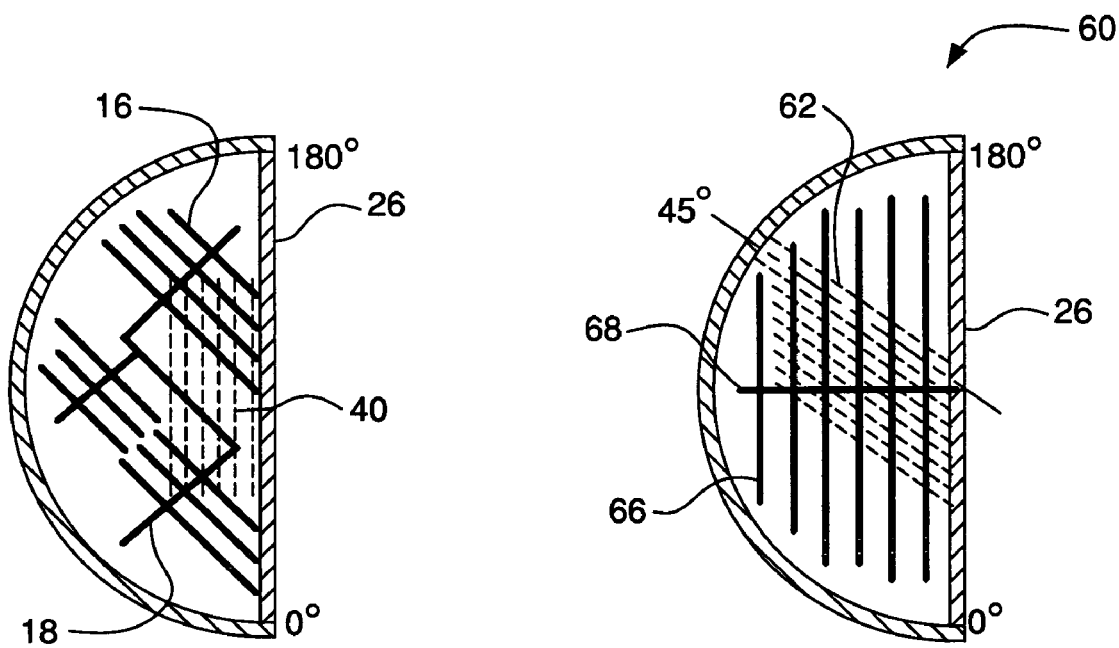
FIG. 16
(Prior Art)
FIG. 17

DIVIDED WALL EXCHANGE COLUMN

BACKGROUND OF THE INVENTION

The present invention relates to divided wall exchange columns for heat and/or mass transfer processes. The invention has particular application in cryogenic air separation processes utilizing distillation, although it also may be used in other heat and/or mass transfer processes which use trays and packing (e.g., random or structured packing).

As used herein, the term "column" (or "exchange column") means a distillation or fractionation column or zone, i.e., a column or zone where liquid and vapor phases are countercurrently contacted to effect separation of a fluid mixture, such as by contacting of the vapor and liquid phases on packing elements or on a series of vertically-spaced trays or plates mounted within the column.

The term "column section" (or "section") means a zone in a column filling all or part of a cross section of the column. The top or bottom of a particular section or zone ends at the liquid and vapor distributors (discussed below) respectively.

The term "packing" means solid or hollow bodies of predetermined size, shape, and configuration used as column internals to provide surface for the liquid to allow mass transfer at the liquid-vapor interface during countercurrent flow of two phases. Two broad classes of packings are "random" and "structured."

"Random packing" means packing wherein individual members do not have any particular orientation relative to each other or to the column axis. Random packings are small, hollow structures with large surface area per unit volume that are loaded at random into a column.

"Structured packing" means packing wherein individual members have specific orientation relative to each other and to the column axis. Structured packings usually are made of thin metal foil, expanded metal, or woven wire screen stacked in layers or as spiral bindings; however, other materials of construction, such as plain sheet metal, may be used.

In processes such as distillation or direct contact cooling, it is advantageous to use structured packing to promote heat and mass transfer between counter-flowing liquid and vapor streams. Structured packing, when compared with random packing or trays, offers the benefits of higher efficiency for heat and mass transfer with lower pressure drop. It also has more predictable performance than random packing.

Cryogenic separation of air is carried out by passing liquid and vapor in countercurrent contact through a distillation column. A vapor phase of the mixture ascends with an ever increasing concentration of the more volatile components (e.g., nitrogen) while a liquid phase of the mixture descends with an ever increasing concentration of the less volatile components (e.g., oxygen).

Various packings or trays may be used to bring the liquid and gaseous phases of the mixture into contact to accomplish mass transfer between the phases. The use of packing for distillation is standard practice and has many advantages where pressure drop is important.

Initial presentation of liquid and vapor to the packing is usually made by means of distributors. A liquid distributor, the role of which is to irrigate the packing substantially uniformly with liquid, is located above the packing, while a vapor distributor, the role of which is to create substantially uniform vapor flow below the packing, is located below the packing.

There are several different types of liquid distributors typically used in air separation processes. One type, a pipe distributor, is comprised of an interconnecting network of closed pipes or ducts, typically comprising a central pipe or manifold and a number of arms or branches radiating from the central pipe. The arms are perforated to allow the liquid passing from the manifold and into the arms to be dripped or sprayed onto a packed bed below the pipe distributor. Upwardly flowing vapor passes easily in between each arm. Pipe distributors receive liquid from a separate liquid collector or an external source piped to the wall of the column.

Trough distributors compromise a collection of interconnecting open troughs having irrigation holes in the base to feed liquid to the packing below. One or more upper collection troughs, or a simple pot on top of the lower troughs feeds liquid to the lower troughs through a series or holes or overflowing notches. Vapor from the packing below passes upward between the liquid-containing troughs.

A divided wall column is in principle a simplification of a system of thermally coupled distillation columns. In divided wall columns, a dividing wall is located in the interior space of the column, such as shown in FIGS. 1 and 2. FIG. 1 illustrates a typical divided wall column 10 using a chord wall 12, while FIG. 2 illustrates another typical divided wall column 10 using an annular wall 14. The dividing wall generally is vertical.

The support of the dividing wall should not interfere with the installation of either the trays or the packing. The use of structured packing in a divided wall column requires that the liquid be uniformly fed over the top of the structured packing by the use of a liquid distributor. These requirements raise serious problems which must be addressed in the design and manufacture of divided wall columns.

For example, since two different mass transfer separations occur on either side of the dividing wall, which may have different operating pressures and temperatures, the dividing wall may have to withstand a pressure differential and/or a temperature differential across the dividing wall. The pressure differential can exert a significant force on the dividing wall, which must be countered by the mechanical design of the wall, and the temperature differential can give rise to an unwanted change in the distillation process adjacent to the dividing wall, which must be countered by some form of thermal resistance (insulation) between the two sides.

In the case of a chord wall design, the force of the pressure differential can be substantial. Prior art designs for countering such force are difficult and/or expensive to manufacture, often lead to an unacceptable loss in the column area available for distillation, or substantially interfere with the distillation process.

Another problem is that the prior art does not satisfactorily address how to design the layout of structured packing and/or trays in divided wall columns or, in the case of structured packing, how to design and arrange the liquid distributor.

U.S. Pat. No. 4,615,770 (Govind) and U.S. Pat. No. 4,681,661 (Govind) disclose dual interrelated distillation columns similar to the annular divided wall column illustrated in FIG. 2 herein. Neither patent addresses the need to increase the strength of the annular wall.

U.S. Pat. No. 5,709,780 (Ognisty, et al.) does recognize the need to minimize mechanical stresses on partition walls in an integrated distillation column having a partitioned stripping or absorption section due to a large pressure differential across the partitioning walls. The patent suggests that a curved or angled wall could be used rather than a substantially planar wall, which is preferred for ease of installation. It also suggests that mechanical stresses can be addressed by using a transverse rib or honeycomb type reinforcement of the partition walls or any trays in the partitioned section. It further suggests that the partition walls can have a laminate construction to establish an air gap or a layer of insulation between adjacent layers, apparently to help minimize stresses induced by temperature differentials.

U.S. Pat. No. 5,785,819 (Kaibel, et al.) discloses a distillation column separated in the middle by two walls with a gas space in between the two walls mounted in a longitudinal direction. The patent suggests the possibility of mounting spacers in the gas space between the two walls in order to increase the mechanical stability.

As discussed, the force on a chord wall can be significant due to pressure differential between the two sections. In addition, the chord geometry itself could require that the chord wall be supported even in cases with minimal or no pressure differential. The simplest way of dividing the column would be to use a flat sheet. However, although the thickness of the sheet can be increased, the increase in strength obtained is relatively poor, especially at large column diameters. Moreover, if the thickness of the chord wall is too dissimilar to that of the outer wall, there are complications associated with the welding of the chord wall to the column wall, as well as simply occupying a greater portion of the column area.

As discussed above, the prior art has attempted to avoid these problems by strengthening the chord wall in a way other than simply increasing the thickness, such as by using laminated or honeycomb walls, strengthening ribs, or even using the trays (if present) as stiffeners. True honeycomb walls and laminated walls are difficult and expensive to manufacture, although such walls do provide the benefit of higher thermal resistance if that is required.

For example, welding ribs to a wall tends to be expensive, since welding can distort a flat sheet, especially if the ribs must be attached only to one side. Also, if ribs are used in a packed column, the ribs may intrude into the structured packing and cause problems both with the installation of the packing and/or the distillation process. In the case of a preassembled stack of self-supporting trays being installed in a column, strengthening ribs on a dividing wall may intrude into the area where the tray stack is to be installed, leading to greater difficulty in installation; additionally, the trays may rest on the ribs when the column is lying on its side for manufacture or transportation and thereby be distorted, as well as cause problems with the distillation process.

It is desired to have a divided wall exchange column utilizing structured packing as a distillation device wherein the dividing wall is strengthened by strengthening means which do not cause a significant loss in distillation performance.

It is further desired to have a divided wall exchange column wherein the dividing wall is adequately strengthened to withstand pressure differentials and minimize temperature differentials across the dividing wall.

It is still further desired to have strengthening means to strengthen the dividing wall in a divided wall exchange column which means are relatively easy to design, manufacture, and install without excessive costs or expense.

It is still further desired to have a divided wall exchange column design which allows for use of a liquid distributor which is relatively easy to design and manufacture.

It is still further desired to have a divided wall exchange column in which the dividing wall can withstand the pressure differentials and minimize the temperature differentials during operation better than the prior art divided exchange columns.

It is still further desired to have an improved divided wall exchange column which overcomes many of the difficulties and disadvantages of the prior art to provide better and more advantageous results.

It also is further desired to have an improved cryogenic air separation plant having an improved divided wall exchange column which overcomes many of the difficulties and disadvantages of the prior art to provide better and more advantageous results.

BRIEF SUMMARY OF THE INVENTION

The present invention is an apparatus used in heat and/or mass transfer processes, including but not limited to cryogenic air separation processes using distillation. There are many embodiments of the invention and many variations of those embodiments.

A first embodiment is an apparatus including an exchange column, a dividing wall, and at least one elongated stiffening member. The exchange column has a longitudinal axis and an inner wall spaced apart from and surrounding the longitudinal axis, thereby being an interior space between the inner wall and the longitudinal axis. The dividing wall is disposed in the interior space, has a first side and a second side, and divides the interior space into at least a first longitudinal space adjacent the first side of the dividing wall and a second longitudinal space adjacent the second side of the dividing wall. The at least one elongated stiffening member has a first end connected to the inner wall of the exchange column and a second end opposite the first end, the second end being connected to the first side or the second side of the dividing wall.

In a variation of the first embodiment, the second end of one elongated stiffening member is connected to the first side of the dividing wall, and the second end of another elongated stiffening member is connected to the second side of the dividing wall.

A second embodiment of the invention includes five elements. The first element is an exchange column having a primary longitudinal axis and an inner wall spaced apart from and surrounding the primary longitudinal axis, thereby being an interior space between the inner wall and the primary longitudinal axis. The second element is a dividing wall which is disposed in the interior space, has a first side and a second side, and divides the interior space into at least a first longitudinal space adjacent the first side of the dividing wall and a second longitudinal space adjacent the second side of the dividing wall. The third element is a first layer of structured packing disposed in the first longitudinal space and having a first longitudinal axis at a first angle relative to the dividing wall. The fourth element is a second layer of structured packing disposed in the first longitudinal space adjacent and below the first layer of structured packing. The second layer of structured packing has a second longitudinal axis at a second angle relative to the dividing wall, the second longitudinal axis being at a rotated angle relative to the first longitudinal axis. The fifth element is at least one elongated stiffening member having a first end connected to the inner wall of the exchange column and a second end opposite the first end. The second end is connected to the first side of the dividing wall, and at least a portion of the at least one elongated stiffening member is disposed in the second layer of structured packing and is substantially parallel to the second longitudinal axis.

In a variation of the second embodiment, the rotated angle is about 90°. In another variation, the first longitudinal axis is substantially parallel to the dividing wall and the second longitudinal axis is substantially perpendicular to the dividing wall.

A third embodiment of the invention includes six elements. The first element is an exchange column having a primary longitudinal axis and an inner wall spaced apart from and surrounding the primary longitudinal axis, thereby being an interior space between the inner wall and the primary longitudinal axis. The second element is a dividing wall which is disposed in the interior space, has a first side and a second side, and divides the interior space into at least a first longitudinal space adjacent the first side of the dividing wall and a second longitudinal space adjacent the second side of the dividing wall. The third element is a first layer of structured packing disposed in the first longitudinal space and having a first longitudinal axis at a first angle relative to the dividing wall, the first angle being greater than 0° degrees and less than 180°. The fourth element is a second layer of structured packing disposed in the first longitudinal space below the first layer of structured packing and having a second longitudinal axis at a second angle relative to the dividing wall, the second angle being greater than 0° degrees and less than 180°. The fifth element is at least one elongated stiffening member having a first end connected to the inner wall of the exchange column and a second end opposite the first end, the second end being connected to the first side of the dividing wall. At least a portion of the at least one elongated stiffening member is disposed in the first layer of structured packing and is substantially parallel to the second longitudinal axis. The sixth element is at least one another elongated stiffening member having a first end connected to the inner wall of the exchange column and a second end opposite the first end, the second end being connected to the first side of the dividing wall. At least a portion of the at least one another elongated stiffening member is disposed in the second layer of the structured packing and is substantially parallel to the second longitudinal axis.

In a variation of the third embodiment, the at least one elongated stiffening member is at a first position and the at least one another elongated stiffening member is at a second position spaced both horizontally and vertically apart from the first position of the at least one elongated stiffening member.

A fourth embodiment of the invention includes two elements. The first element is an exchange column having a longitudinal axis and an inner wall spaced apart from and surrounding the longitudinal axis, thereby being and interior space between the inner wall and the longitudinal axis. The second element is a dividing wall disposed in the interior space. The dividing wall includes four sub-elements. The first sub-element is a first plate having an outer surface and an inner surface opposite the outer surface. The second sub-element is a second plate having an exterior surface and an interior surface opposite the exterior surface and spaced apart from the inner surface of the first plate. The third sub-element is at least one projection fixedly connected to the inner surface of the first plate and adapted to be spaced apart from the interior surface of the second plate. The fourth sub-element is at least one another projection fixedly connected to the interior surface of the second plate. The another projection is adapted to be spaced apart from the inner surface of the first plate and spaced apart laterally from the at least one projection. In the fourth embodiment, the dividing wall divides the interior space into at least a first longitudinal space adjacent the outer surface of the first plate and a second longitudinal space adjacent the exterior surface of the second plate.

There are many variations of the fourth embodiment. In one variation, at least one of the at least one projection and the at least one another projection has a tapered surface. In another variation, at least a portion of the first plate has a first thermal conductivity and at least a portion of the at least one projection has another thermal conductivity different from the first thermal conductivity. In yet another variation, at least a portion of at least one of the at least one projection touches a portion of the interior surface of the second plate, or at least a portion of at least one of the another projection touches a portion of the inner surface of the first plate. In still yet another variation, the at least one projection is horizontal and has at least one aperture adapted to transmit a vertically ascending fluid.

A fifth embodiment of the invention is similar to the fourth embodiment but also includes at least one elongated stiffening member having a first end connected to the inner wall of the exchange column and a second end opposite the first end, the second end being connected to the outer surface of the first plate or the exterior surface of the second plate.

A sixth embodiment of the invention includes four elements. The first element is an exchange column having a first longitudinal axis and an inner wall spaced apart from and surrounding the first longitudinal axis, thereby being an interior space between the inner wall and the first longitudinal axis. The second element is a dividing wall which is disposed in the interior space, has a first side and a second side, and divides the interior space into at least a first longitudinal space adjacent the first side of the dividing wall and a second longitudinal space adjacent the second side of the dividing wall. The third element is a layer of structured packing disposed in the first longitudinal space, the layer of structured packing having a second longitudinal axis. The fourth element is a distributor adjacent the layer of structured packing and having at least one fluid distributing device adapted to distribute at least a portion of the fluid from the distributor to the layer of structured packing. The fluid distributing device has a third longitudinal axis substantially parallel to the first side of the dividing wall. In the sixth embodiment, the second longitudinal axis of the layer of structured packing is at an angle relative to the dividing wall, the angle being greater than about 0° and less than about 90°.

There are several variations of the sixth embodiment. In one variation, the angle is between about 30° and about 60°. In a variant of that variation, the angle is about 4520.

BRIEF DESCRIPTION OF SEVERAL VIEWS OF THE DRAWINGS

The invention will be described by way of example with reference to the accompanying drawings, in which:

FIGS. 7 through 10 are schematic diagrams illustrating an embodiment of the present invention using tie bars or other stiffening members in staggered positions within several layers of structured packing in a repeating sequence (7, 8, 9, 10) of layers of structured packing within a column;

FIG. 15 is a schematic diagram illustrating a typical packed column having a liquid pipe distributor with the distributor arms positioned at a 45° angle relative to the sheets of the structured packing;

FIG. 16 is a schematic diagram illustrating a typical design of a liquid pipe distributor required for a divided wall column having structured packing on one side of the divided wall; and FIG. 17 is a schematic diagram illustrating another embodiment of the present invention wherein the design of the distributor is less complex (than the distributor design in FIG. 16) because the top layer of the structured packing has been oriented at a 45° angle relative to the dividing wall of the divided wall column.

DETAILED DESCRIPTION OF THE INVENTION

The present invention is discussed herein in the context of divided wall exchange columns used for air separation processes. Persons skilled in the art will recognize, however, that the invention may be utilized in other processes which use divided wall exchange columns.

In modern air separation plants, structured packing is most often used as the preferred mass transfer device, although trays may still be used in specific circumstances for specific applications. For some applications, structured packing may be used on one side of the dividing wall, while trays are used on the other side of the dividing wall.

Figure 1:
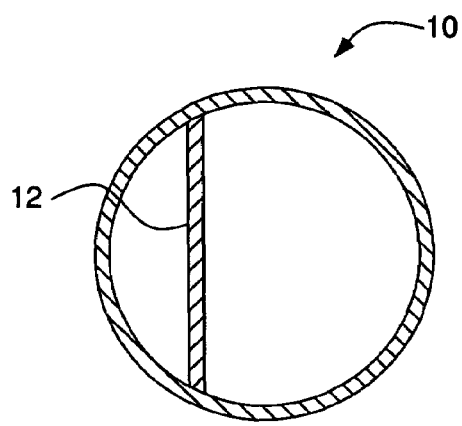
FIG. 1 is a schematic diagram illustrating a prior art divided wall column using a chord wall.
Figure 2:
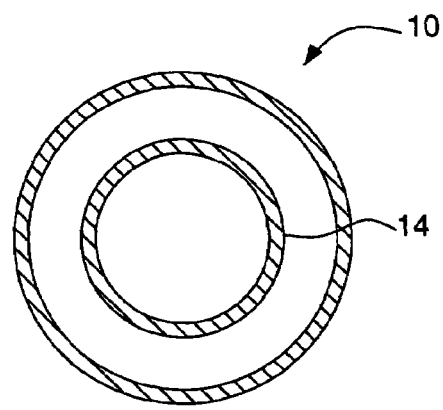
FIG. 2 is a schematic diagram illustrating another prior art divided wall column using an annular wall.
Figure 3:
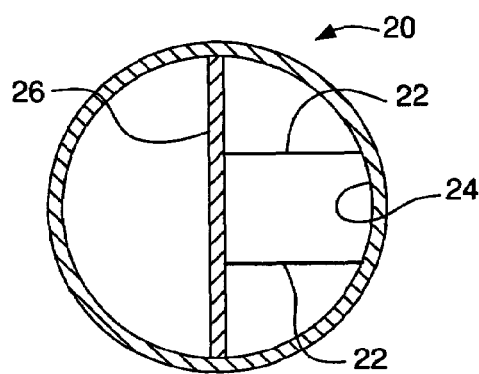
FIG. 3 is a schematic diagram illustrating an embodiment of the present invention using tie bars or other stiffening members.

One embodiment of an exchange column 20 using the present invention is shown in FIG. 3 where one end of a stiffening member 22, such as a tie-bar, is connected to the inner wall 24 of the column and the other end of the stiffening member is connected to the dividing wall 26 to stiffen the dividing wall. More than one stiffening member (e.g., tie-bar), as shown in FIG. 3, may be used for this purpose.

Figure 4:
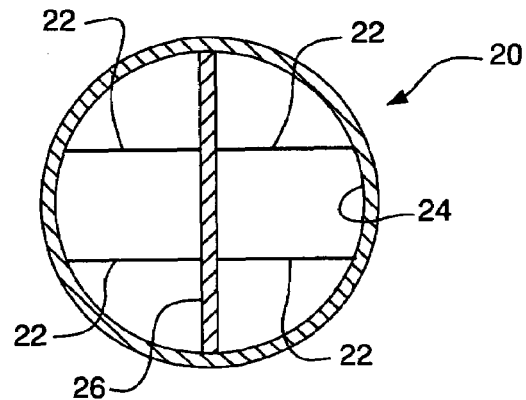
FIG. 4 is a schematic diagram illustrating another embodiment of the present invention using tie bars or other stiffening members.

The stiffening members 22, such as tie-bars, may be used on both sides of the dividing wall 26 to stiffen it when structured packing (not shown) is used as the mass transfer device on both sides of the divided column, as illustrated in FIG. 4. If, as illustrated in FIG. 3, trays (not shown) are used on one side of the dividing wall and structured packing (not shown) is used on the other side, then the preferred position of the stiffening members 22 is on the structured packing side (the right side of the column, as shown in FIG. 3).

Figure 5:
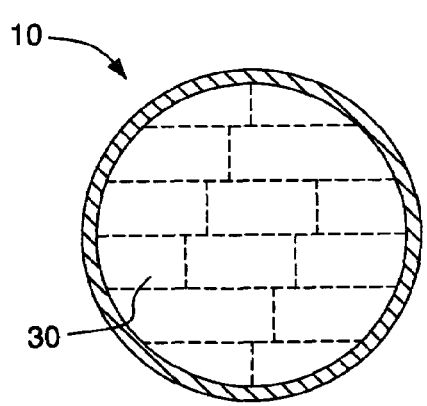
FIG. 5 is a schematic diagram illustrating a typical column containing structured packing segments.

FIG. 5 illustrates a typical column 10 containing structured packing segments 30 made from individual sheets of packing. In order to make installation of the structured packing easier, especially in large columns, it is common to make each layer of packing in segments.

Figure 6:
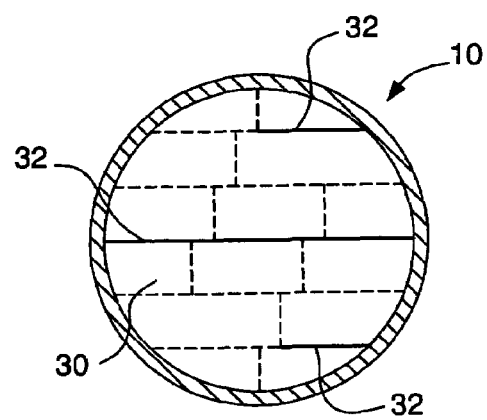
FIG. 6 is a schematic diagram illustrating a typical column containing structured packing segments utilizing shims.
Figure 11:
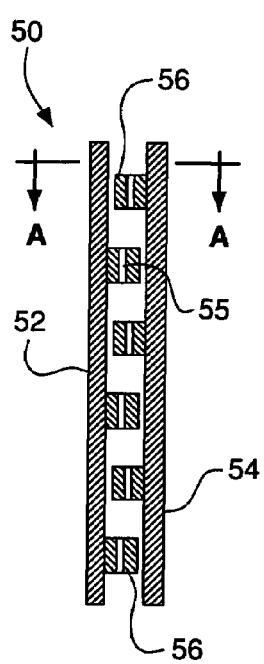
FIG. 11 is a schematic diagram illustrating a cross-sectional elevation view of another embodiment of the present invention using internal projections in a double-wall design for the dividing wall in a divided wall column.

On occasion, shims 32 may be placed between each segment of packing, as shown in FIG. 6, to make sure that the structured packing is positioned centrally within the column 10, thus leaving approximately equal gaps around the column circumference between the edge of the packing and the inner wall of the column. Shims also are sometimes used to ensure tightness of fit of the segments of packing by compensating for differences in tolerances. Sometimes the shims run parallel to the packing elements, as shown by the longitudinal shims 32 in FIG. 6, and sometimes other shims (not shown), called butt shims, run perpendicular to the elements at the ends of the segments.

Consequently, there often is extra material (e.g., metal) placed in parallel with the structured packing segments 30, as shown by the longitudinal shims 32 in FIG. 6. Therefore, the stiffening members 22 (e.g., tie-bars) used in the present invention may be installed between the segments of structured packing in a manner similar to the longitudinal shims 32 shown in FIG. 6 without inducing any further effects beyond the comparable effect created by the presence of a shim.

In addition, the stiffening members 22 may be staggered from layer to layer within a packed divided wall exchange column. An example of this is illustrated in FIGS. 7 through 10. In this embodiment of the invention 20, the stiffening members 22 (e.g., tie-bars) are in staggered positions within several layers of structured packing 40 in a repeating sequence (e.g., A, B, C, D) of four layers of structured packing within the column, as illustrated in FIG. 7 (type A), FIG. 8 (type B), FIG. 9 (type C), and FIG. 10 (type D). As shown, the adjacent layers of packing in the repeating sequence (A, B, C, D) are aligned such that the elements of the packing in one layer are at a 90° angle relative to the next layer of packing. (Persons skilled in the art will recognize that the angle may be some angle other than 90°.)

In FIG. 7, the sheets of type "A" packing 40 are substantially parallel to the dividing wall 26. The next layer of packing, i.e., type "B," illustrated in FIG. 8, is at an angle of 90° (i.e., perpendicular to the dividing wall). The next layer of packing, type "C," is substantially parallel to the dividing wall, as shown in FIG. 9. However the elements of the type "A" packing and type "C" packing slope in different directions, as shown in FIGS. 7A and 9A, although this may not necessarily be so. The fourth layer of packing is type "D" at 90° (i.e., perpendicular to the dividing wall), as shown in FIG. 10.

The embodiment shown in FIGS. 7-10 illustrates the repeating sequence A, B, C, D, a sequence which may be repeated down through the column. Layer types A (FIG. 7) and C (FIG. 9) differ in that the structured packing elements 40 lying against the dividing wall 26 are oriented in different directions, although this may not necessarily be so. Layer types B (FIG. 8) and D (FIG. 9) differ in that the location of the stiffening members 22 are staggered, although this may not necessarily be so.

Since the stiffening members 22 passing through segments of structured packing 40, as shown in FIGS. 8 and 10, are not significantly different than the shims 32 typically used, as shown in FIG. 6, the stiffening members 22 have little or no impact on the mass transfer performance of the structured packing beyond the comparable impact created by the presence of one or more shims.

Additional embodiments of the present invention are illustrated in FIGS. 11-14 and 11A-14A. These embodiments may be employed where there is a significant temperature difference across the dividing wall, making it necessary to provide some form of thermal resistance between the two sides of the dividing wall as well as extra strength. One way to do this would be to make one or the other of the dividing walls out of a material with a lower thermal conductivity. However, this could lead to problems with welding two different materials together. Such problems may be avoided by using the double-wall design shown in FIGS. 11-14 and 11A-14A, which provides both strength and thermal resistance while causing only some minor loss of column area.

As shown in FIGS. 11-14 and 11A-14A, the two plates (52, 54) forming the double-wall dividing wall 50 have projections (56, 56') welded on each of the facing sides of the plates. Each projection is connected to one plate, but not the opposing plate. However, the plates may be brought close enough together so that the tips of the projections may actually touch the opposing plates. The projections preferably are horizontal, but may be vertical if required. In either case, the projections should allow the free entry and exit of gas or vapor between the opposing plates so as to eliminate pressure differences occurring between the plates.

The projections (56, 56') on plate 52 should not but may touch plate 54, and the projections (56, 56') on plate 54 should not touch plate 52, as shown by the gaps between the projections and the plates in FIGS. 11-14 and 11A-14A. The projections act as baffles, minimizing convection currents and transferring heat from one plate to the other. If the gap is closed, resulting in the projections touching the plates (e.g., in a situation where the dividing wall distorts slightly more than expected during manufacture or when in operation), some of the force will be transferred locally from one plate to the other plate. Even if this happens, the projections are designed to minimize heat transfer. To allow pressure equalization in such a situation, the projections have a series of apertures 55 which allow fluid to pass from one side of the projection to the other.

Figure 12:
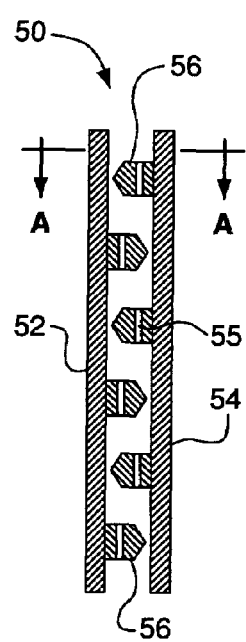
FIG. 12 is a schematic diagram illustrating a cross-sectional elevation view of another embodiment of the present invention using internal projections in a double-wall design for the dividing wall in a divided wall column.
Figure 13:
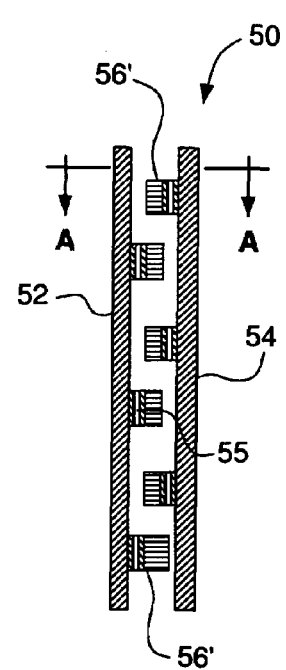
FIGS. 13 and 14 are schematic diagrams illustrating cross-sectional elevation views of two other embodiments of the present invention similar to those shown in FIGS. 11 and 12 wherein the projections are made of two materials, one of the materials having a thermal conductivity different than the thermal conductivity of the plate to which the projections are attached.
Figure 14:
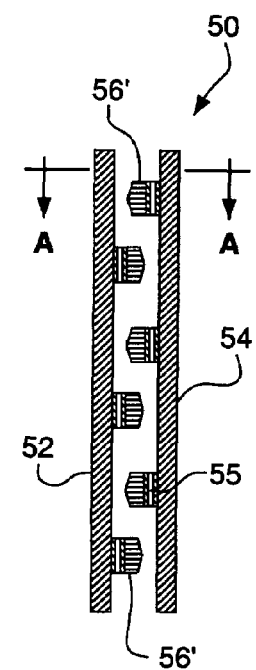
Figure 11A:
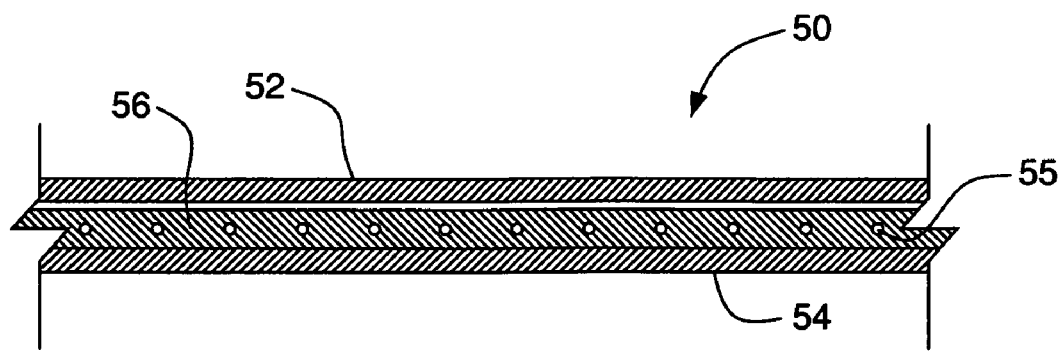
FIG. 11A is a schematic diagram illustrating a cross-sectional plan view of this embodiment.
Figure 12A:
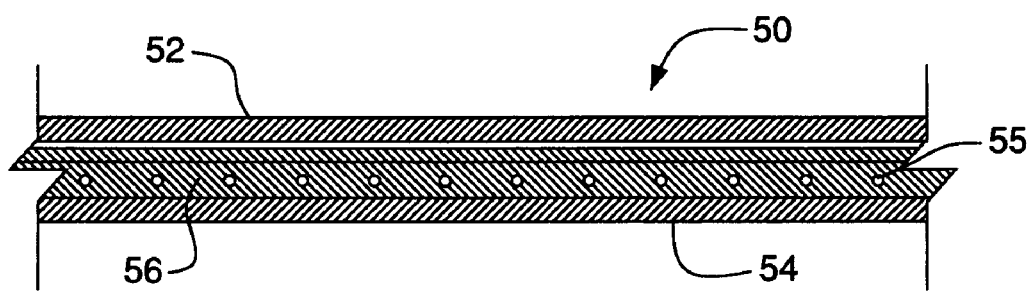
FIG. 12A is a schematic diagram illustrating a cross-sectional plan view of this embodiment.
Figure 13A:
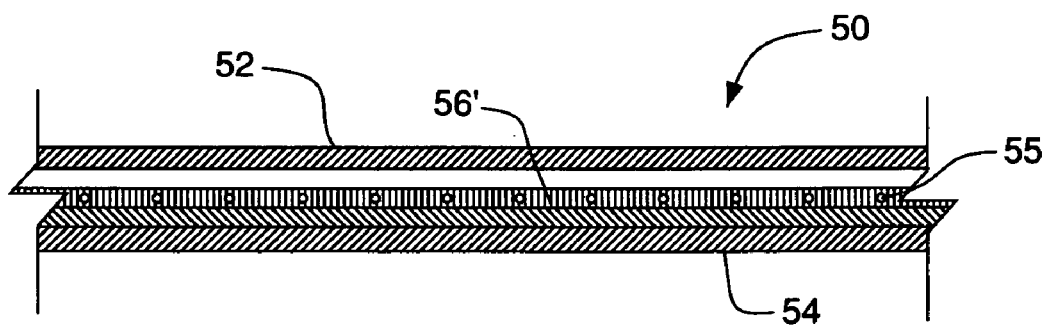
FIGS. 13A and 14A are schematic diagrams illustrating cross-sectional plan views of the two embodiments shown in FIGS. 13 and 14.
Figure 14A:
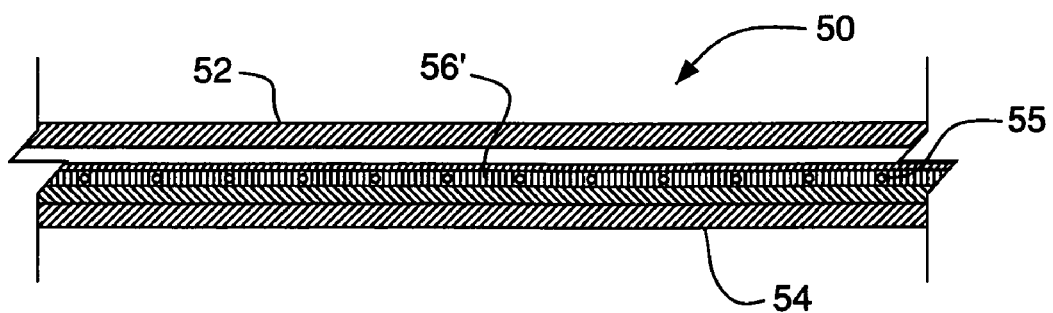

In order to reduce heat transfer between the two plates (52, 54), the "contacting" edges of the projections (56, 56') may be angled to minimize the material in contact, as shown in FIGS. 12 and 14. Also, as shown in FIGS. 13 and 14 (and in 13A and 14A), different materials with different thermal conductivities may be used for the projections 56'. A material with a lower thermal conductivity is used on that part of the projection 56' that would come in contact with the opposite plate (52, 54).

The embodiments of the present invention illustrated in FIGS. 11-14 and 11A-14A provide several advantages. First, substantially flat surfaces on both sides of the double-wall dividing wall 50 are presented to the column for ease of installation of the structured packing and/or the trays. Also, the double-wall dividing wall is simpler and less expensive to manufacture than a laminated or honeycomb wall, and it provides good heat transfer resistance. Each wall of the double-wall dividing wall can be manufactured separately without requiring extremely high accuracy, since each wall is supposed to remain apart as a separate item after installation but will still perform as substantially as desired if they should come into contact at any point.

Persons skilled in the art will recognize that the double-wall dividing walls 50 shown in FIGS. 11-14 and 11A-14A also may be used in combination with other wall strengthening and/or thermal insulating techniques. For example, the stiffening members 22 shown in FIGS. 3 and 4 may be used in conjunction with the double-wall dividing walls shown in FIGS. 11-14 and 11A-14A.

Typically, a section of an exchange column containing structured packing preferably is fed with a substantially uniform liquid feed across the top. For a cylindrical column 10, it is common to have a liquid distributor with "arms" 16 fed by a manifold 18 such as shown in FIG. 15. As illustrated, the arms of the liquid distributor may be positioned at a 45° angle (or another desired angle) relative to the sheets of structured packing 40 in order to improve the irrigation pattern with respect to the packing sheets while minimizing complexity of manufacturing. The liquid is fed to the arms of the distributor through the manifold. This arrangement provides for the desired irrigation of the structured packing with liquid flowing from rows of holes in the arms of the liquid distributor.

In the case of a divided wall column, where the column is divided roughly in half by a chord wall, the arrangement of the holes in the arms of the liquid distributor must still be such that the structured packing is properly irrigated. Preferably, in a divided wall column the sheets in the layers of structured packing will be aligned such that the manufacture and installation of the packing is easy, preferably with the packing sheets lying either substantially perpendicular or parallel to the chord wall. Since the section of packing in one section of the divided column is no longer circular in shape, and given the preferred packing orientation, it is not possible to simply rotate the liquid distributor so that the rows of holes are at or around 45° to the packing sheets in the top layer. The arms 16 and manifold 18 of the required liquid distributor would be something like that shown in FIG. 16. This results in problems with the design and extra manufacturing costs of the liquid distributor, since the arms must now be constructed such that the rows of holes are angled and so a standard design may no longer be used.

An embodiment of the divided wall column 60 of the present invention shown in FIG. 17 avoids this problem by orienting the top layer of structured packing 62 at some angle such as 45° relative to the dividing wall 26. This arrangement of the packing is referred to herein as type "E." This arrangement allows a normal design of the liquid distributor to be used, having arms 66 substantially parallel to the dividing wall and a manifold 68 substantially straight and perpendicular to the dividing wall, as shown in FIG. 17. This eliminates the design and manufacturing problems required for the arrangement shown in FIG. 16 by using existing proven technology of existing liquid distributor designs. Persons skilled in the art will recognize that the invention also may be used with other types of distributors, including trough distributors.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. An apparatus, comprising:
   an exchange column having a primary longitudinal axis,
   an inner wall spaced apart from and surrounding the primary longitudinal axis, thereby being an interior space between the inner wall and the primary longitudinal axis;

a dividing wall disposed in the interior space, the dividing wall having a first side and a second side and dividing the interior space into at least a first longitudinal space adjacent the first side of the dividing wall and a second longitudinal space adjacent the second side of the dividing wall;

a first layer of structured packing disposed in the first longitudinal space, the first layer of structured packing having a first longitudinal axis at a first angle relative to the dividing wall;

a second layer of structured packing disposed in the first longitudinal space adjacent and below the first layer of structured packing, the second layer of structured packing having a second longitudinal axis at a second angle relative to the dividing wall, the second longitudinal axis being at a rotated angle relative to the first longitudinal axis; and at least one elongated stiffening member having a first end connected to the inner wall of the exchange column and a second end opposite the first end, the second end being connected to the first side of the dividing wall, at least a portion of the at least one elongated stiffening member being disposed in the second layer of structured packing and being substantially parallel to the second longitudinal axis.

2. An apparatus as in claim 1, wherein the rotated angle is about 90°.

3. An apparatus as in claim 2, wherein the first longitudinal axis is substantially parallel to the dividing wall and the second longitudinal axis is substantially perpendicular to the dividing wall.

4. An apparatus, comprising:

an exchange column having a primary longitudinal axis, an inner wall spaced apart from and surrounding the primary longitudinal axis, thereby being an interior space between the inner wall and the primary longitudinal axis;

a dividing wall disposed in the interior space, the dividing wall having a first side and a second side and dividing the interior space into at least a first longitudinal space adjacent the first side of the dividing wall and a second longitudinal space adjacent the second side of the dividing wall;

a first layer of structured packing disposed in the first longitudinal space, the first layer of structured packing having a first longitudinal axis at a first angle relative to the dividing wall, the first angle being greater than 0° and less than 180°;

a second layer of structured packing disposed in the first longitudinal space below the first layer of structured packing, the second layer of structured packing having a second longitudinal axis at a second angle relative to the dividing wall, the second angle being greater than 0° and less than 180°;

at least one elongated stiffening member having a first end connected to the inner wall of the exchange column and a second end opposite the first end, the second end being connected to the first side of the dividing wall, at least a portion of the at least one elongated stiffening member being disposed in the first layer of structured packing and being substantially parallel to the second longitudinal axis; and at least one another elongated stiffening member having a first end connected to the inner wall of the exchange column and a second end opposite the first end, the second end being connected to the first side of the dividing wall, at least a portion of the at least one another elongated stiffening member being disposed in the second layer of structured packing and being substantially parallel to the second longitudinal axis.

5. An apparatus as in claim 4, wherein the at least one elongated stiffening member is at a first position and the at least one another elongated stiffening member is at a second position spaced both horizontally and vertically apart from the first position of the at least one elongated stiffening member.

* * * * *